June 11, 1968  C. N. CAMPBELL, JR  3,388,026
HEAT SEALING MACHINE

Original Filed Dec. 16, 1963  2 Sheets-Sheet 1

INVENTOR.
CLAUDE N. CAMPBELL, JR.
BY
Paul + Paul
ATTORNEYS.

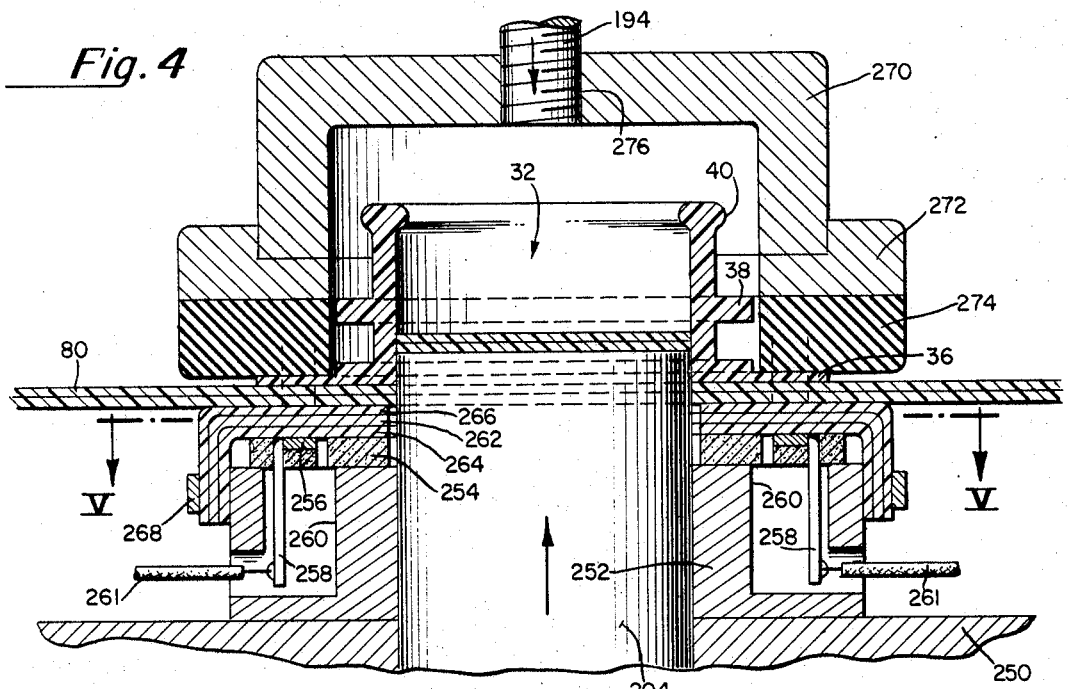
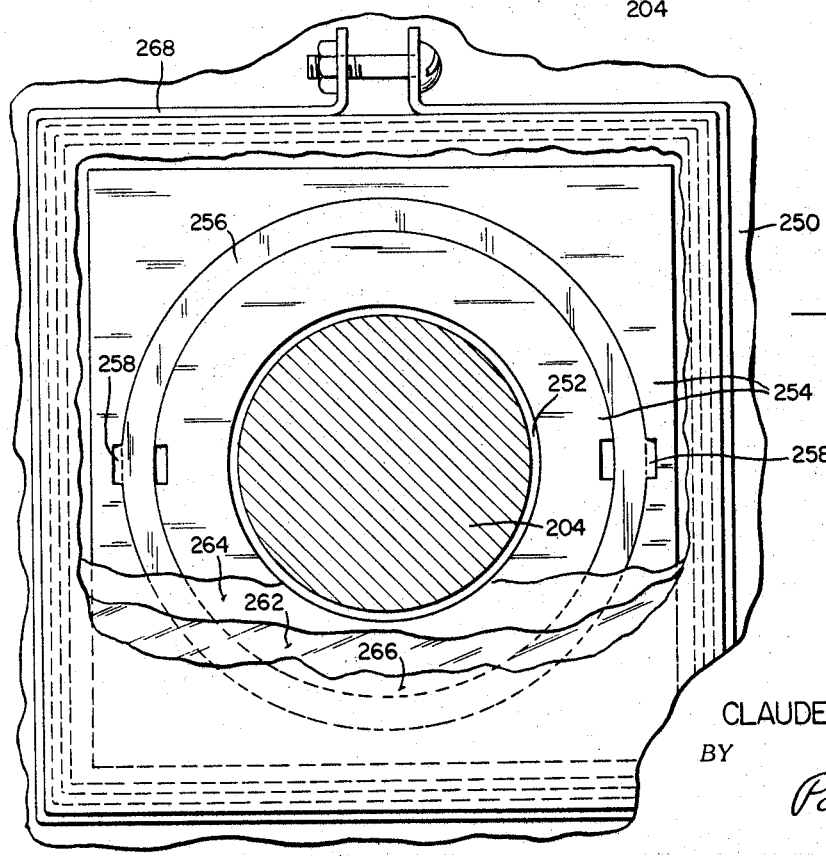

United States Patent Office 3,388,026
Patented June 11, 1968

3,388,026
HEAT SEALING MACHINE
Claude N. Campbell, Jr., "Deepwell," Warren St.,
Edgewater Park, N.J. 07020
Original application Dec. 16, 1963, Ser. No. 330,904, now Patent No. 3,283,671, dated Nov. 8, 1966. Divided and this application July 19, 1966, Ser. No. 578,914
2 Claims. (Cl. 156—513)

ABSTRACT OF THE DISCLOSURE

An asbestos pad, a heating element, and a sheet of aluminum foil clad with Teflon coated Fiberglas cover a mail die. A female die is adapted to bear on the flange of a thermoplastic nipple and press it down on a sheet of thermoplastic material overlying the aluminum foil clad with Teflon coated Fiberglas. The heating element is electrically heated, and the heat therefrom passes through the overlying areas of the thermoplastic sheet material and the flange of the thermoplastic nipple, fusing them together. A punch extends upwardly through the male die, asbestos pad, heating element and aluminum foil and into the nipple, being adapted for punching a hole in the thermoplastic sheet material.

Cross-references to related applications

This application is a divisional of my copending application, Ser. No. 330,904, filed Dec. 16, 1963, now Patent No. 3,383,671.

Background of the invention

This invention relates generally to bag making machines and particularly to machines for making bags using heat-sealable sheet material.

A principal object of the invention is to provide a machine for making such bags each consisting of two foldless mutually overlying sheet material panels respectively severed from a pair of continuous webs of said sheet material and of a nipple through which the bag may be filled and emptied.

Another object is to provide such a machine with novel means for sealing nipples to one of said webs of sheet material.

Other objects of the invention will become apparent when the following description is read with reference to the accompanying drawings, in which:

FIG. 4 is a vertical section through the means for sealing the nipples; and

FIG. 5 is a horizontal section on line V—V in FIG. 4.

Figure 1:
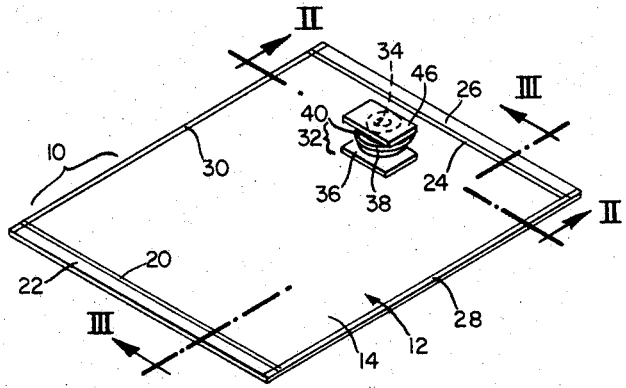
FIG. 1 is a perspective view of a bag produced by the machine.

The following description is directed to the specific form of the invention illustrated in the drawings and is not intended to be addressed to the scope of the invention itself, which may be practiced in a variety of forms.

Figure 2:
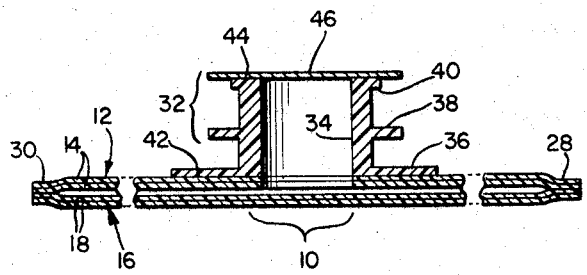
FIGS. 2 and 3 are enlarged sections respectively on lines II—II and III—III in FIG. 1.
Figure 3:
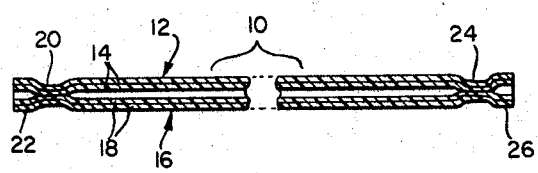

Referring particularly to FIGS. 1, 2 and 3, a bag produced by a machine constructed in accordance with the invention, generally designated 10, comprises a panel 12 including two plies 14 of thermoplastic sheet material and a panel 16 including two plies 18 of thermoplastic sheet material. The bottom of the bag is heat sealed, as at 20, leaving an unsealed marginal area 22, while the top of the bag is heat sealed, as at 24, leaving an unsealed marginal area 26. The opposite side marginal areas of the bag are heat sealed, as at 28 and 30. Overlying the panel 12 is a tubular nipple 32 of thermoplastic material provided with a through opening, designated 34. The nipple 32 is provided with a flange 36 at its base, a flange 38 intermediate the ends thereof and a flange 40 at its top. The flange 36 is heat sealed to the panel 12, as at 42, and a patch 46 of thermoplastic tape is heat sealed to the flange 40, as at 44.

Reference may be had to the copending application aforesaid for a description of the bag making machine and its operation generally. A part in said copending application and the corresponding part in the present application are conveniently identified with the same numeral.

Referring particularly to FIGS. 4 and 5, the arrangement of the means for sealing the nipples 32 to the web 80 and of the means for punching the holes in the web 80 in the process of fabricating the panels 12, comprises a base plate 250 mounting a male die 252, which accommodates a punch 204. Overlying the die 252 is an asbestos pad 254, which accommodates the punch 204. Nested on the asbestos pad 254 is a ring 256 provided with depending lugs 258 accommodated by suitable recesses 260 formed in the male die 252. Connected to the lugs 258 are electric wires 261 for energizing the ring 256 and bringing it up to sealing temperature. Overlying the asbestos pad 254 and the ring 256 is a sheet of aluminum foil 262 sandwiched between sheets of Teflon coated Fiberglas 264 and 266, all secured to the male die 252, as by a clamp 268, and all centrally apertured to accommodate the punch 204. Overlying the male die 252 is a female die 270 provided with an annular flange 272 faced with rubber 274. The female die is secured to the rod 194, as at 276.

When the rod 194 is extended, the female die 270 decends and presses the flange 36 of the nipple 32 down upon the web 80. At the same time the ring 256 is energized and brought up to sealing temperature. The aluminum foil 262 serves to conduct the heat radially outwardly and inwardly from the ring 256 so that the sealing action takes place over a greater area to provide a more satisfactory seal. The sheets of Teflon coated Fiberglas 264 and 266 are employed to prevent fusing of the web material to the Nichrome wire 256.

What is claimed is:

1. In apparatus adapted for affixing to a sheet of thermoplastic material the flange of a nipple made of thermoplastic material, the combination comprising a stationary member, an asbestos pad overlying said stationary member, an electric heating element overlying said pad, a sheet of metal foil clad with Teflon coated Fiberglas overlying said heating element, a movable member adapted for engaging the flange of said nipple and pressing it down upon the area of said sheet of thermoplastic material overlying said sheet of metal foil clad with Teflon coated Fiberglas, means for energizing said heating element thereby to heat the same to sealing temperature, whereby heat is applied to said sheet of thermoplastic material through said sheet of metal foil, a punch slidable in said stationary member and operable for extending upwardly freely through registering openings in said pad, heating element, metal foil, and the flange of said nipple for punching an opening in said sheet of thermoplastic material.

2. The combination according to claim 1 wherein the heating element is in direct contact with only a comparatively small undersurface area of the sheet of metal foil clad with Teflon coated Fiberglas.

References Cited

UNITED STATES PATENTS

| 2,432,463 | 12/1947 | Watson | 219—243 |
| 2,714,416 | 8/1955 | Fener | 219—243 |

EARL M. BERGERT, *Primary Examiner.*

D. J. DRUMMOND, *Examiner.*